US010924823B1

(12) United States Patent
Binder et al.

(10) Patent No.: US 10,924,823 B1
(45) Date of Patent: Feb. 16, 2021

(54) CLOUD-BASED IMAGE RENDERING FOR VIDEO STREAM ENRICHMENT

(71) Applicant: Disney Enterprises, Inc., Burbank, CA (US)

(72) Inventors: Evan A. Binder, Calabasas, CA (US); Marc Junyent Martin, Barcelona (ES); Jordi Badia Pujol, Madrid (ES); Avner Swerdlow, Los Angeles, CA (US); Miquel Angel Farre Guiu, Bern (CH)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/551,467

(22) Filed: Aug. 26, 2019

(51) Int. Cl.
*H04N 21/8545* (2011.01)
*H04L 29/08* (2006.01)
*G06T 15/00* (2011.01)
*H04N 21/858* (2011.01)
(Continued)

(52) U.S. Cl.
CPC ....... *H04N 21/8545* (2013.01); *G06T 15/005* (2013.01); *H04L 65/607* (2013.01); *H04L 65/608* (2013.01); *H04L 67/02* (2013.01); *H04N 21/8456* (2013.01); *H04N 21/858* (2013.01)

(58) Field of Classification Search
CPC .......... H04N 21/8545; H04N 21/8456; H04N 21/858; G06T 15/005; H04L 65/607; H04L 65/608; H04L 67/02
See application file for complete search history.

(56) References Cited

U.S. PATENT DOCUMENTS 10,194,177 B1  1/2019 Ashbacher
10,271,077 B2  4/2019 Shi
(Continued)

FOREIGN PATENT DOCUMENTS

WO  WO2018213481  11/2018
WO  WO2019058111  3/2019

OTHER PUBLICATIONS

"Recast—Integrate Singular into Your NDI Workflow," Singular. Live. pp. 1-3.
(Continued)

*Primary Examiner* — John R Schnurr
(74) *Attorney, Agent, or Firm* — Farjami & Farjami LLP

(57) ABSTRACT

According to one implementation, a cloud-based system for performing cloud-based image rendering for video stream enrichment includes a video forwarding unit and a video enrichment unit. The video forwarding unit is configured to detect one or more non-interactive video player(s) linked to the video forwarding unit over a communication network, forward a video stream to the non-interactive video player (s), and forward the video stream to the video enrichment unit. The video enrichment unit is configured to receive the video stream, detect one or more interactive video player(s) linked to the video enrichment unit over the communication network, identify a video enhancement corresponding to one or more customizable video segment(s) in the video stream, insert a rendered video enhancement into the one or more customizable video segment(s) to produce an enriched video stream, and distribute the enriched video stream to one or more of the interactive video player(s).

20 Claims, 3 Drawing Sheets

(51) Int. Cl.
*H04L 29/06* (2006.01)
*H04N 21/845* (2011.01)

(56) References Cited

U.S. PATENT DOCUMENTS

| | | | |
|---|---|---|---|
| 2010/0162307 A1* | 6/2010 | Suh | H04N 21/6175 |
| | | | 725/39 |
| 2010/0257550 A1* | 10/2010 | Slothouber | H04N 21/8545 |
| | | | 725/32 |
| 2013/0202150 A1* | 8/2013 | Sinha | H04N 21/432 |
| | | | 382/100 |
| 2014/0289627 A1* | 9/2014 | Brockmann | H04N 21/23412 |
| | | | 715/719 |
| 2015/0032900 A1 | 1/2015 | Shanson | |
| 2017/0280175 A1* | 9/2017 | Fein | H04N 21/23424 |
| 2017/0366867 A1* | 12/2017 | Davies | H04N 21/4882 |
| 2018/0131975 A1* | 5/2018 | Badawiyeh | H04N 21/222 |
| 2018/0343489 A1 | 11/2018 | Loheide | |
| 2019/0028758 A1 | 1/2019 | Talvensaari | |
| 2020/0066304 A1* | 2/2020 | Chen | H04N 21/2343 |

OTHER PUBLICATIONS

"Live Broadcast from the Cloud- Perfecting the Media Experience," Elemental Technologies. 2019. pp. 1-6.

* cited by examiner

CLOUD-BASED IMAGE RENDERING FOR VIDEO STREAM ENRICHMENT

BACKGROUND

Mobile streaming applications on most personal communication devices, such as smartphones and tablet computers, for example, are typically not optimized for sophisticated graphical interactivity enabled by video game engines, but instead rely on native software stacks designed to support video streaming. As a result, it is often challenging to later include an interactive experience built for a game engine into a streaming application executed on a mobile device.

One conventional technique for including an interactive experience built for a game engine into a streaming application has been to develop a container solution that allows game engine based applications to reside within native video streaming applications built for a particular platform. However, containers are typically expensive to implement due to their relatively high initial build cost, a recurring cost for every feature or experience that is included in the container, and the additional processing overhead required to run each experience.

Another conventional solution is to create an entirely separate application for interactive experiences. However, this potential solution risks product and brand confusion for users, and also results in increased costs associated with marketing and customer acquisition, as well as application support and maintenance. Moreover, mobile interactivity may be limited by the processing capacity of the mobile devices themselves, which tends to be significantly lower than that of gaming consoles or personal computers configured for gaming. This processing constraint may necessitate a distinct asset creation and rendering pipeline for creating a separate interactive application for use on mobile devices, which can undesirably result in considerable additional cost.

SUMMARY

There are provided systems and methods for performing cloud-based image rendering for video stream enrichment, substantially as shown in and/or described in connection with at least one of the figures, and as set forth more completely in the claims.

DETAILED DESCRIPTION

Figure 1:
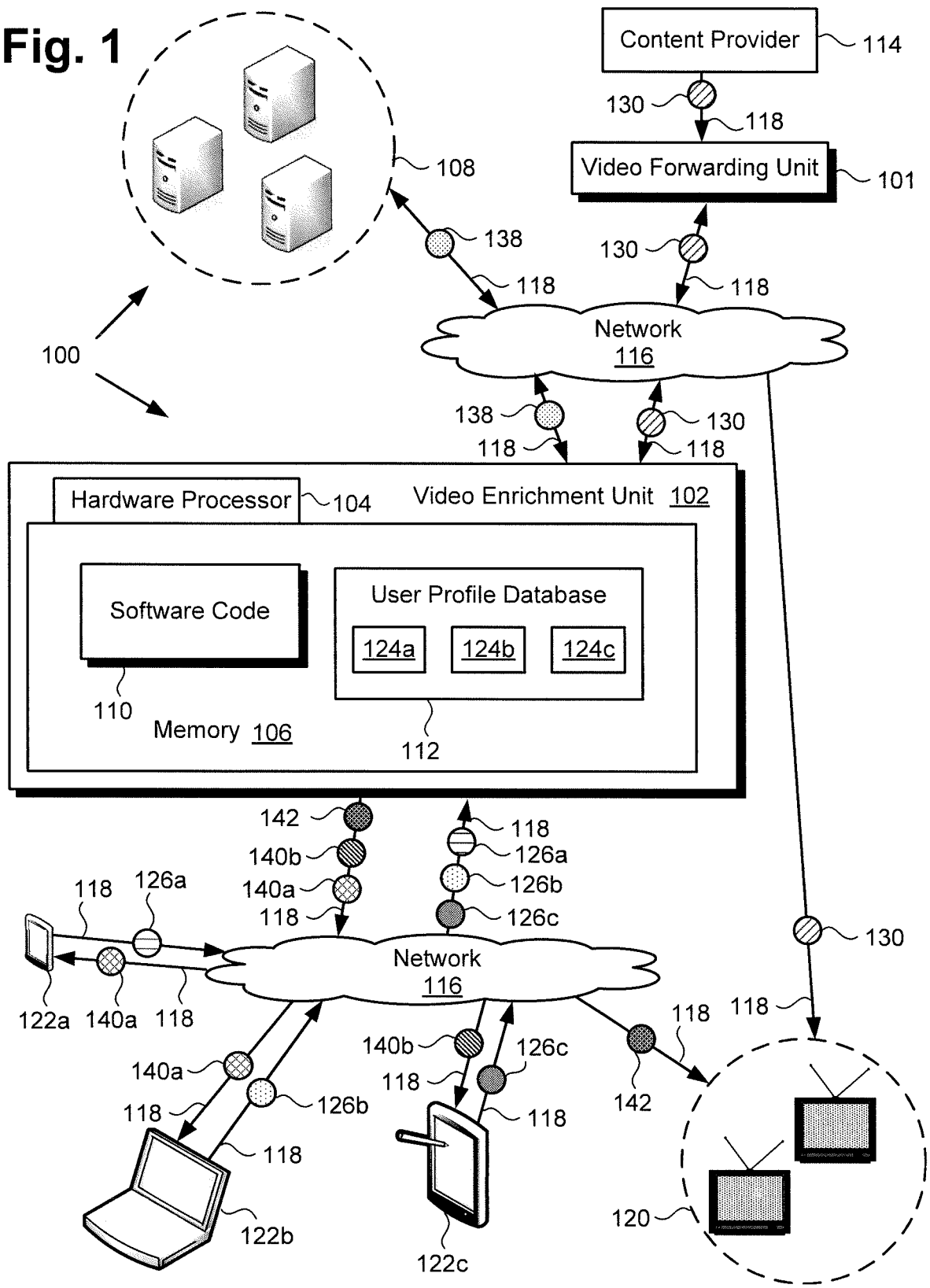
FIG. 1 shows a diagram of an exemplary system for performing cloud-based image rendering for video stream enrichment, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing cloud-based image rendering for video stream enrichment that address and overcome the deficiencies in the conventional art. Moreover, the present video stream enrichment solution may be implemented as an automated process. It is noted that, as used in the present application, the term "automated" refers to systems and processes that do not require human intervention. Although, in some implementations, a human system administrator may review or even modify content enrichment determinations made by the systems and according to the methods described herein, that human involvement is optional. Thus, the cloud-based video stream enrichment solution described in the present application may be performed under the control of hardware processing components of the disclosed systems.

FIG. 1 shows a diagram of exemplary system 100 for performing cloud-based image rendering for video stream enrichment, according to one implementation. As shown in FIG. 1, system 100 includes video forwarding unit 101, video enrichment unit 102, and one or more video rendering engine(s) 108, such as video rendering servers, for example. As further shown in FIG. 1, video enrichment unit 102 of system 100 may include hardware processor 104 and memory 106 implemented as a non-transitory storage device storing software code 110. Moreover, in some implementations, as depicted in FIG. 1, memory 106 of video enrichment unit 102 may store user profile database 112 including user profiles 124a, 124b, and 124c (hereinafter "user profiles 124a-124c").

System 100 is implemented in a video distribution environment including content provider 114, one or more non-interactive video players 120 (hereinafter "non-interactive video player(s) 120"), one or more interactive video players 122a, 122b, and 122c (hereinafter "interactive video player(s) 122a-122c"), and communication network 116 having communication links 118 linking the elements of system 100 to one another, as well as to content provider 114, non-interactive video player(s) 120, and interactive video player(s) 122a-122c. In addition, FIG. 1 shows video stream 130 provided to system 100 by content provider 114 and forwarded to non-interactive video player(s) 120 and video enrichment unit 102, one or more rendered video enhancements 138 (hereinafter "rendered video enhancement(s) 138") obtained by video enrichment unit 102 from video rendering engine(s) 108, and enriched video streams 140a and 140b including rendered video enhancement(s) 138 distributed by video enrichment unit 102. Also shown in FIG. 1 are user input data 126a, 126b, and 126c received by video enrichment unit 102 from respective interactive video player(s) 122a-122c, and lightly enhanced video stream 142 optionally distributed to one or more of non-interactive video player(s) 120.

With respect to the representation of system 100 shown in FIG. 1, it is noted that although software code 110 and user profile database 112 are depicted as being stored in memory 106 for conceptual clarity, more generally, memory 106 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as hardware processor 104 of video enrichment unit 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts software code 110 and user profile database 112 as being mutually co-located in memory 106, that representation is also merely provided as an aid to conceptual clarity. More generally, system 100 may include one or more computing platforms, such as computer servers for example, which may be co-located, or may be part of an interactively linked but distributed system. For example, in one implementation, video forwarding unit 101, video enrichment unit 102, and video rendering engine(s) 108 may be part of cloud-based distributed system 100 interactively linked by communication network 116 and network communication links 118. Thus, it is to be understood that each of video forwarding unit 101, video enrichment unit 102, video rendering engine(s) 108, and user profile database 112 may be remote from one another within the distributed resources of cloud-based system 100.

It is also noted that, although interactive video player(s) 122a-122c are shown respectively as smartphone 122a, laptop computer 122b, and tablet computer 122c, in FIG. 1, those representations are provided merely by way of example. More generally, interactive video player(s) 122a-122c may be any suitable mobile or stationary devices or systems that implement data processing capabilities sufficient to support connections to communication network 116, and implement the functionality ascribed to interactive video player(s) 122a-122c herein. For example, in other implementations, interactive video player(s) 122a-122c may take the form of a desktop computer, a smart television (smart TV), or a gaming console.

As defined in the present application, the feature "interactive video player" refers to a video player including a user interface, such as a web browser for example, supporting user feedback enabling a user of the interactive video player to actively participate in the action depicted by playback of a video stream by the interactive video player. For example, an interactive video player may enable a user viewing a sporting event to provide inputs that change the viewpoint of the action and show three-dimensional (3D) renderings of the playing field and athletes from a perspective selected by the user. Moreover, in such an implementation, the interactive video player may enable the user to request special imagery conforming to their personal preferences, such as a 3D overlay showing statistics for one or more athletes on a fantasy sports team of the user.

As another example, an interactive video player displaying a movie to a user may enable the user to take control of an object or character appearing in a particular segment of the movie. For instance, in a customizable video segment of a movie showing an automobile race, a user of the interactive video player playing back the movie may take control of one of the race vehicles to become a virtual participant in the auto race.

By contrast, as defined in the present application, non-interactive video player(s) 120 provide only basic user controls, such as "play," "pause," "stop," "rewind," and "fast forward," as well as volume control, thereby enabling only passive consumption of the content included in video stream 130 by content provider 114, or lightly enhanced video stream 142. That is to say, non-interactive video player(s) 120 may be configured to merely display the base content and graphical overlays selected by content provider 114 and included in video stream 130 forwarded to non-interactive video player(s) 120 by video to forwarding unit 101 of system 100.

In one implementation, content provider 114 may be a media entity providing TV content as video stream 130. Video stream 130 may be a linear TV program stream, for example, including an ultra high-definition (ultra HD), high-definition (HD), or standard-definition (SD) baseband video signal with embedded audio, captions, time code, and other ancillary metadata, such as ratings and/or parental guidelines. In some implementations, video stream 130 may include multiple audio tracks, and may utilize secondary audio programming (SAP) and/or Descriptive Video Service (DVS), for example.

Video stream 130 may include the same source video content broadcast to a traditional TV audience using a TV broadcasting platform (not shown in FIG. 1), which may include a conventional cable and/or satellite network, for example. In addition, and as depicted in FIG. 1, content provider 114 may find it advantageous or desirable to make content included in video stream 130 available via an alternative distribution channel, such as communication network 116, which may include a packet-switched network, for example, such as the Internet.

According to the implementation of FIG. 1, video forwarding unit 101 detects non-interactive video player(s) 120 linked to video forwarding unit 101 over communication network 116, forwards video stream 130 to non-interactive video player(s) 120, and forwards the same video stream 130 to video enrichment unit 102 over communication network 116. Video enrichment unit 102 receives video stream 130 from video forwarding unit 101, detects interactive video player(s) 122a-122c linked to video enrichment unit 102 over communication network 116, and identifies a video enhancement corresponding to one or more customizable video segments in video stream 130. In addition, video enrichment unit 102 inserts the video enhancement as rendered video enhancement(s) 138 obtained from rendering engine(s) 108 into the one or more customizable video segments to produce enriched video stream 140a and/or 140b, and distributes the enriched video stream or streams to one or more of interactive video player(s) 122a-122c. In other words, the video enhancement(s) 138 are not rendered on interactive video player(s) 122a-122c. Instead, the video enhancement(s) are rendered by remote rendering engine(s) 108 in the cloud-based distributed system 100.

Video enrichment unit 102 of system 100 is configured to distribute enriched video stream 140a and/or 140b substantially in real-time with respect to receiving video stream 130 from video forwarding unit 101. Moreover, in some implementations, system 100 is configured to distribute video stream 130 or lightly enhanced video stream 142 to non-interactive video player(s) 120 and to distribute enriched video stream 140a and/or 140b to interactive video player(s) 122a-122c substantially concurrently.

As a result of the foregoing, the same base video stream 130 can advantageously be used to distribute enriched video content to interactive video player(s) 122a-122c capable of enabling interactive user feedback, as well as to distribute non-enriched video content to non-interactive video player(s) 120 lacking that functionality. The non-enriched video streams distributed to non-interactive video player(s) 120 may provide the content included in video stream 130 by content provider 114, without enhancement or customization. In other words, the customizable video segments included in video stream 130 provided to non-interactive video player(s) 120 may include only the generic and predetermined content inserted into video stream 130 by content provider 114.

However, it is noted that in some implementations, video stream 130 may include some basic enhancements and be distributed to one or more of non-interactive video player(s) 120 as lightly enhanced video stream 142 by video enrichment unit 102. For example, where video stream 130 is a broadcast of a sporting event, and one of user profiles 124a-124c corresponding to a user of one of non-interactive video player(s) 120 includes data identifying a favorite team of that user, team colors and/or a team logo may be included in lightly enhanced video stream 142 as basic graphical overlays.

Figure 2A:
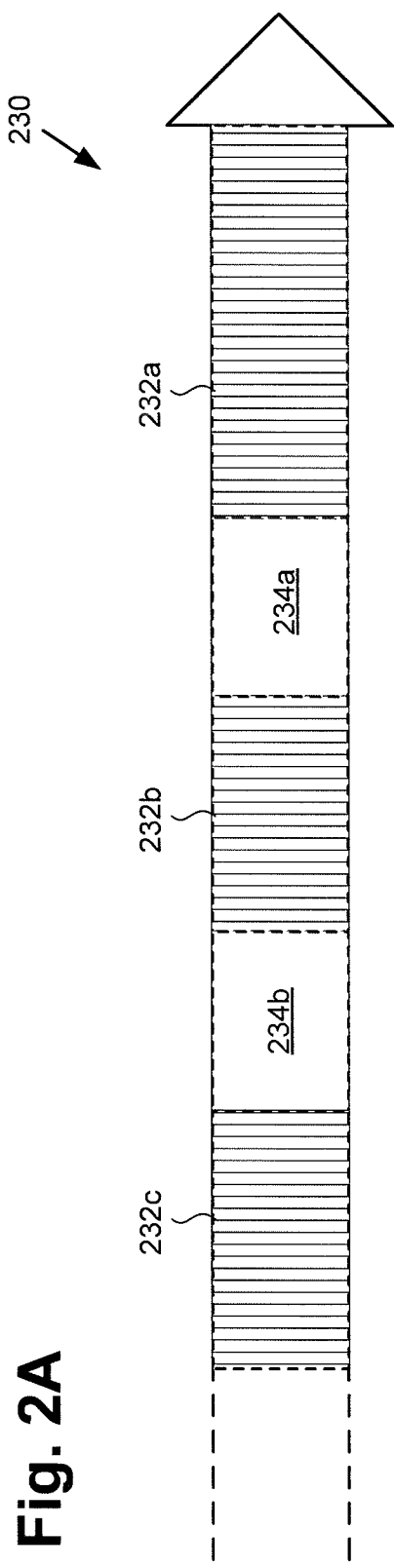
FIG. 2A shows a diagram of an exemplary video stream including customizable video segments, according to one implementation.

FIG. 2A shows a more detailed diagram of an exemplary video stream including customizable video segments, according to one implementation. As shown in FIG. 2A video stream 230 includes one or more predetermined video segments 232a, 232b, and 232c (hereinafter "predetermined video segments 232a-232c") and one or more customizable video segments 234a and 234b. It is noted that although video stream 230 is shown to include three predetermined video segments 232a-232c and two customizable video segments 234a and 234b, that representation is provided in the interests of clarity and economy of presentation. More generally, video stream 230 may include more or many more than three predetermined video segments 232a-232c. Moreover, video stream 230 includes at least one of customizable video segments 234a or 234b, but may include more or many more than two customizable video segments.

Predetermined video segments 232a-232c include content included in video stream 230 by content provider 114 and are not subject to change. By contrast, customizable video segments 234a and 234b include default content in video stream 230 that may be enriched, for example, by being enhanced or replaced by rendered video enhancement 138 in FIG. 1. Video stream 230, in FIG. 2A, corresponds in general to video stream 130, in FIG. 1. That is to say, video stream 130 may share any of the characteristics attributed to corresponding video stream 230 by the present disclosure, and vice versa. Consequently, although not shown in FIG. 1, video stream 130 may include features corresponding respectively to predetermined video segments 232a-232c and customizable video segments 234a and 234b.

Figure 2B:
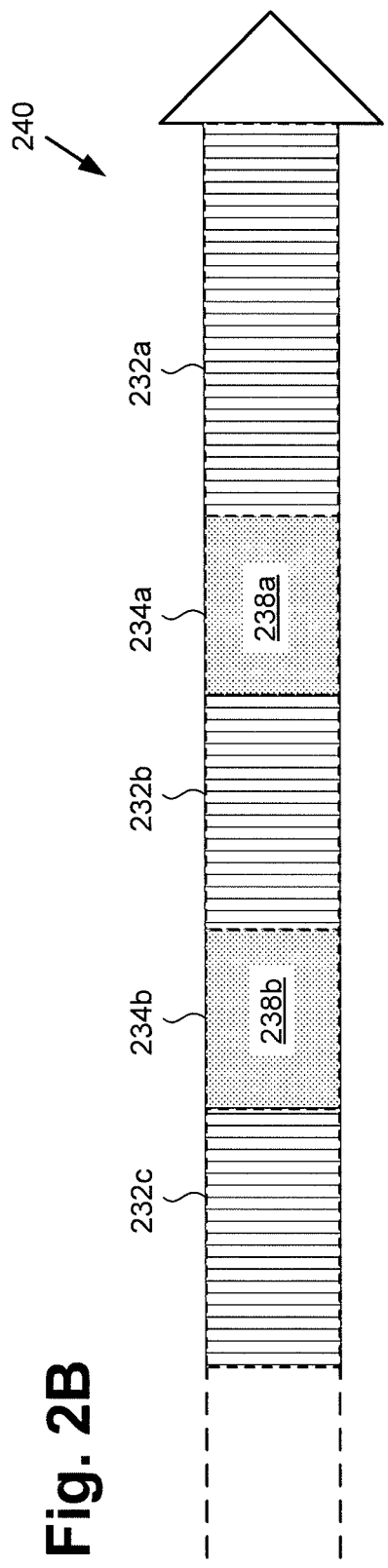
FIG. 2B shows a diagram of an exemplary enriched video stream including customizable video segments having rendered video enhancements inserted therein, according to one implementation.

FIG. 2B shows a more detailed diagram of exemplary enriched video stream 240 including customizable video segments 234a and 234b having respective rendered video enhancements 238a and 238b inserted therein, according to one implementation. It is noted that any feature in FIG. 2B identified by a reference number identical to one appearing in FIG. 2A corresponds respectively to that feature and may share any of the characteristics attributed to it above.

Enriched video stream 240, in FIG. 2B, corresponds in general to either or both of enriched video streams 140a and 140b, in FIG. 1. That is to say, enriched video streams 140a and 140b may share any of the characteristics attributed to corresponding enriched video stream 240 by the present disclosure, and vice versa. Consequently, although not shown in FIG. 1, enriched video streams 140a and 140b may include features corresponding respectively to predetermined video segments 232a-232c and customizable video segments 234a and 234b having respective rendered video enhancements 238a and 238b inserted therein.

In addition, rendered video enhancements 238a and 238b correspond in general to rendered video enhancement(s) 138, in FIG. 1, Thus, rendered video enhancements 238a and 238b may share any of the characters attributed to rendered video enhancement 138(s) by the present disclosure, and vice versa.

Figure 3:
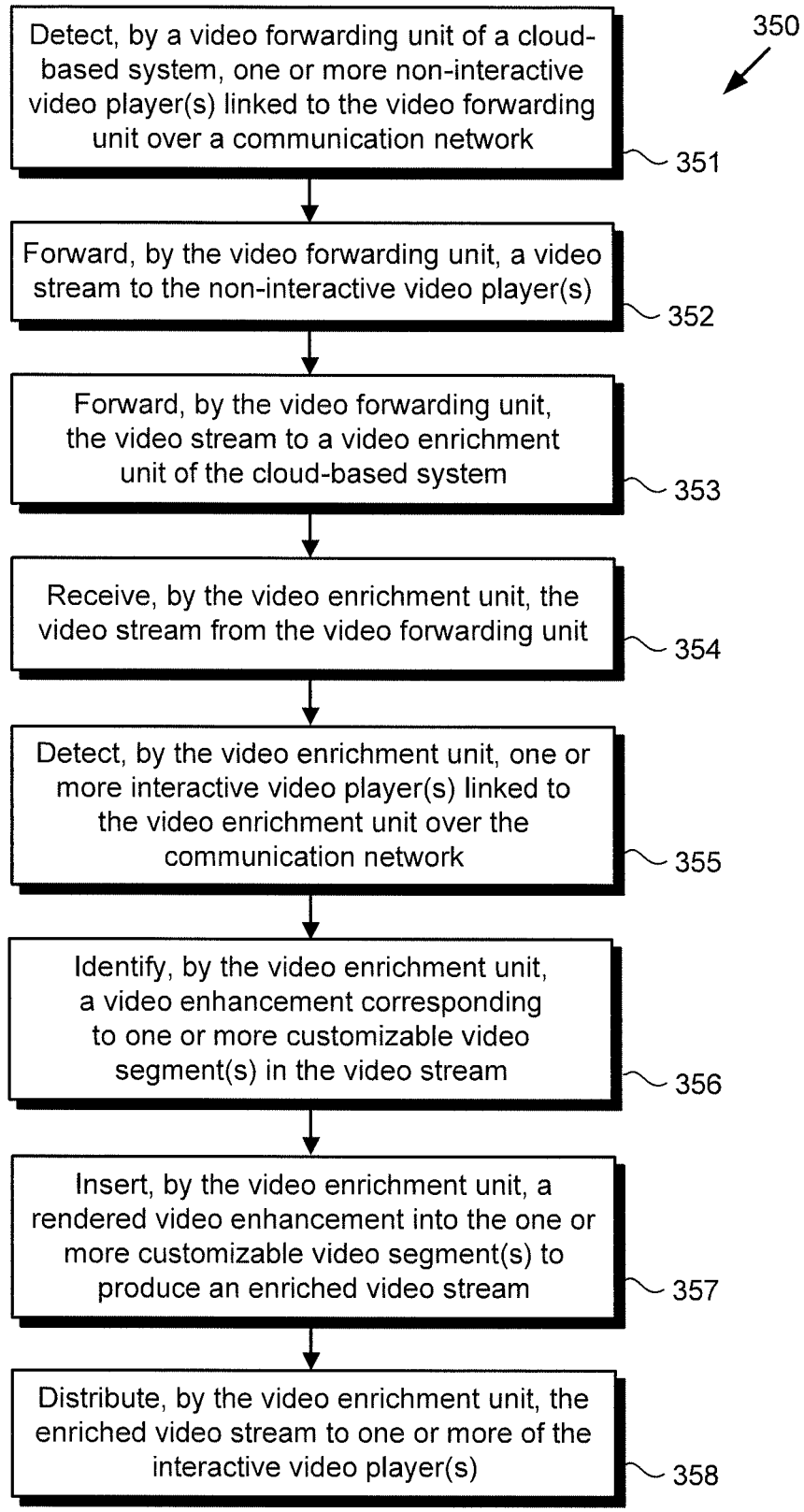
FIG. 3 shows a flowchart presenting an exemplary method for performing cloud-based image rendering for video stream enrichment, according to one implementation.

The functionality of system 100 will be further described by reference to FIG. 3 in combination with FIGS. 1, 2A, and 2B. FIG. 3 shows flowchart 350 presenting an exemplary method for performing cloud-based image rendering for video stream enrichment, according to one implementation. With respect to the method outlined in FIG. 3, it is noted that certain details and features have been left out of flowchart 350 in order not to obscure the discussion of the inventive features in the present application.

Referring to FIG. 3 in combination with FIGS. 1 and 2A, flowchart 350 begins with detecting, by video forwarding unit 101 of system 100, non-interactive video player(s) 120 linked to video forwarding unit 101 over communication network 116 (action 351). Non-interactive video player(s) 120 are video players that are not configured to receive or transmit user inputs enabling the user to actively participate in the action depicted by playback of a video stream. As discussed above, non-interactive video player(s) 120 provide only basic user controls, such as "play," "pause," "stop," "rewind," and "fast forward," as well as volume control, thereby enabling only passive consumption of the content included in video stream 130/230 or lightly enhanced video stream 142.

Flowchart 350 continues with forwarding, by video forwarding unit 101, video stream 130/230 to non-interactive video player(s) 120 (action 352). In some implementations, video stream 130/230 is forwarded to non-interactive video player(s) 120 as an unenhanced video stream. That is to say, in those implementations, video stream 130/230 includes only the content received by video forwarding unit 101 from content provider 114 when it is forwarded to non-interactive video player(s) 120.

However, as noted above, in some implementations, video stream 130/230 may include some basic enhancements and be distributed to one or more of non-interactive video player(s) 120 as lightly enhanced video stream 142 by video enrichment unit 102. For example, where video stream 130/230 is a broadcast of a sporting event, and one of user profiles 124a-124c corresponding to a user of one of non-interactive video player(s) 120 includes data identifying a favorite team of that user, team colors and/or a team logo may be included in lightly enhanced video stream 142 as basic graphical overlays. Alternatively, non-interactive video player(s) 120 may receive basic enhancements based on their geographical location. For instance, non-interactive video player(s) 120 located in the state of Texas and receiving lightly enhanced video stream 142 of a professional football game may have team colors and/or team logos for both Texas based professional football franchises in lightly enhanced video stream 142 as graphical overlays.

It is noted that the "light enhancements" included in lightly enhanced video stream 142 by video enrichment unit 102 may be distinguished from the video enhancements rendered as rendered video enhancement(s) 138/238a/238b in that, by contrast to rendered video enhancements 138/238a/238b, the light enhancements included in lightly enhanced video stream 142 neither require nor invite user feedback. On the contrary, the light video enhancements included in lightly enhanced video stream 142 are typically limited to two-dimensional (2D) or 3D graphical overlays of team colors and/or logos, and/or player statistics provided for passive consumption by user(s) of non-interactive video player(s) 120 as an accompaniment to the content included in video stream 130.

Flowchart 350 continues with forwarding, by video forwarding unit 101, video stream 130/230 to video enrichment unit 102 (action 353), and receiving, by video enrichment unit 102, video stream 130/230 from video forwarding unit 101 (action 354). In some implementations, video stream 130/230 is forwarded to and received by video enhancement unit 102 as an unenhanced video stream. That is to say, in those implementations, video stream 130/230 includes only the content received by video forwarding unit 101 from content provider 114 when it is forwarded to video enhancement unit 102. Video stream 130/230 may be received by video enhancement unit 102 through use of software code 110, executed by hardware processor 104.

Flowchart 350 continues with detecting, by video enrichment unit 102, interactive video player(s) 122a-122c linked to video enrichment unit 102 over communication network 116 (action 355). As discussed above, interactive video player(s) 122a-122c are video players including a user interface, such as a web browser for example, supporting user feedback enabling the user of the interactive video player to actively participate in the action depicted by playback of a video stream by the interactive video player. Thus, interactive video player(s) 122a-122c may take the form of smartphones, desktop or laptop computers, tablet computers, smart TVs, or gaming consoles, for example. Detection of interactive video player(s) 122a-122c may be performed by software code 110 of video enrichment unit 102, executed by hardware processor 104.

Flowchart 350 continues with identifying, by video enrichment unit 102, a video enhancement corresponding to one or more of customizable video segments 234a and 234b in video stream 130/230 (action 356). Identification of a video enhancement corresponding to one or more of customizable video segments 234a and 234b may be performed by software code 110 of video enrichment unit 102, executed by hardware processor 104, and may be based on any of several different criteria. In the interests of conceptual clarity, action 356 and the subsequent actions of flowchart 350 will be described by reference to interactive video player 122a. However, it is noted that the present method is equally applicable to any of interactive video player(s) 122a-122c.

Where one of user profiles 124a-124c, such as user profile 124a for example, corresponds to a user of interactive video player 122a, information stored in user profile 124a can be used to identify a video enhancement corresponding to one or more of customizable video segments 234a and 234b in video stream 130/230. For instance, a viewing history of the user, user preferences stored in user profile 124a, or the user's age, gender, or location of residence may be used to identify a desirable video enhancement corresponding to one or more of customizable video segments 234a and 234b in video stream 130/230. Alternatively, or in addition, information stored in user profile 124a describing the interactive features and functionality of interactive video player 122a may be used to identify a desirable video enhancement corresponding to one or more of customizable video segments 234a and 234b. Thus, in some implementations, identification of a video enhancement in action 356 may be performed automatically, without user feedback.

However, in other implementations, the user of interactive video player 122a may affirmatively provide user input data 126a selecting or otherwise enabling identification of a desirable video enhancement corresponding to one or more of customizable video segments 234a and 234b in video stream 130/230. For example, in some implementations, particularly in use cases in which the information stored in user profile 124a is sparse, user input data 126a may be solicited from the user of interactive video player 122a. User input data 126a may identify a favorite sports team, athlete, movie, TV program, dramatic character, or actor of the user of interactive video player 122a, to name a few examples.

Referring to flowchart 350 with further reference to FIG. 2B, flowchart 350 continues with inserting, by video enrichment unit 102, rendered video enhancement(s) 138/238a/238b into one or more of customizable video segments 234a and 234b to produce enriched video stream 140/240 (action 357). Insertion of rendered video enhancement(s) 138/238a/238b into one or more of customizable video segments 234a and 234b may be performed by software code 110 of video enrichment unit 102, executed by hardware processor 104.

In some implementations, rendered video enhancement(s) 138/238a/238b may take the form of a user interactive object rendered as a 3D image. For example, user input data 126a from a user of interactive video player 122a watching a sporting event may cause video enrichment unit 102 to insert rendered video enhancement(s) 138/238a/238b in the form of 3D renderings of the playing field and athletes from a perspective selected by the user. In addition, or alternatively, in such an implementation, rendered video enhancement(s) 138/238a/238b may take the form of a 3D overlay showing team statistics or statistics for one or more individual athletes. Moreover, in some implementations, rendered video enhancement(s) 138/238a/238b may take the form of an interactive quiz, game, or poll enabling multiple users to collaboratively participate in providing feedback and/or selecting additional video enhancements for rendering and insertion into one or more of customizable video segments 234a and 234b.

As shown in FIG. 1, in some implementations, video enrichment unit 102 may obtain rendered video enhancement(s) 138/238a/238b from one of video rendering engine(s) 108 communicatively coupled to video enrichment unit 102. As further shown in FIG. 1, in some of those implementations, video enrichment unit 102 may be communicatively coupled to video rendering engine(s) 108 via communication network 116. As noted above, in some use cases, communication network 116 may be a packet-switched network, such as the Internet. However, in other implementations, communication network 116 may include a broadband cellular network, such as a fourth generation cellular network (4G network), or a 5G network satisfying the IMT-2020 requirements established by the International Telecommunication Union (ITU), for example.

Thus, in some implementations, video enrichment unit 102 may identify a video enhancement corresponding to one or more of customizable video segments 234a and 234b in action 356, but the rendering of that video enhancement to produce rendered video enhancement(s) 138/238a/238b may be performed by one of video rendering engine(s) 108. In some of those implementations, video rendering engine(s) 108 may be configured to encode rendered video enhancement(s) 138/238a/238b as one of Hypertext Transfer Protocol (HTTP) Live Stream (HLS) video, low-latency HLS (LHLS) video, or Dynamic Adaptive Streaming over HTTP (DASH) video, for example.

Moreover, in some implementations in which the rendering of rendered video enhancement(s) 138/238a/238b is performed by one of video rendering engine(s) 108, rendered video enhancement(s) 138/238a/238b may include a metadata tag applied by video rendering engine(s) 108 that instructs interactive video player 122a to enable interactive feedback by the user of interactive video player 122a during playback of rendered video enhancement(s) 138/238a/238b. For example, such a metadata tag may take the form of an ID3 tag stored in rendered video enhancement(s) 138/238a/238b by video rendering engine(s) 108. It is noted that rendered video enhancement(s) 138/238a/238b may be generated from video enhancement templates stored by the distributed memory resources of cloud-based system 100 and accessible by rendering engine(s) 108.

In some implementations, Flowchart 350 can conclude with distributing, by video enrichment unit 102, enriched video stream 140a/240 to one or more of interactive video player(s) 122a-122c (action 358). Distribution of enriched video stream 140a/240 in action 358 may be performed by software code 110 of video enrichment unit 102, executed by hardware processor 104, and via communication network 116. As noted above, in some implementations, distribution of enriched video stream 140a/240 to one or more of interactive video player(s) 122a-122c may occur in real-time with respect to video enrichment unit 102 receiving video stream 130/230 from video forwarding unit 101.

In some use cases, enriched video stream 140a/240 may be produced and distributed to a single interactive video player, such as interactive video player 122a. However, in other implementations, more than one interactive video player may be used by a group of users sharing the experience of viewing video content together. In those implementations, the same enriched video stream may be distributed to multiple interactive video players, as shown in FIG. 1 by enriched video stream 140a being distributed to both of interactive video players 122a and 122b. That is to say, in some implementations, enriched video stream 140a may be distributed to more than one but less than all of interactive video player(s) 122a-122c linked to video enrichment unit 102.

It is noted that the order in which actions 351 through 358 are described by flowchart 350 is merely exemplary. That is to say, in other implementations, actions 351 through 358 may have their order rearranged, and/or some of actions 351-358 may be performed substantially in parallel. For example, in one implementation, actions 351 and 355 may be performed in parallel, while in another implementation, action 355 may be performed before actions 351 through 354. Alternatively, in some implementations, actions 352 and 353 may be performed in parallel. As yet another example, in some implementations, actions 351 and 352 may be performed after action 358.

It is also noted that actions 356, 357, and 358 may be performed in sequence for multiple different interactive video player(s) 122a-122c concurrently. That is to say, concurrently with performance of actions 356, 357, and 358 of flowchart 350 for interactive video player 122b and/or 122a described above, those same actions may be performed by video enrichment unit 102 for one or more others of interactive video player(s) 122a-122c. For example, in the case of interactive video player 122c, video enrichment unit 102 may identify a different video enhancement corresponding to one or more of customizable video segments 234a and 234b for interactive video player 122c, and may insert that different video enhancement as a different rendered video enhancement 138/238a/238b into customizable video segment 234a and/or 234b to produce different enriched video stream 140b/240. Video enrichment unit 102 may then distribute different enriched video stream 140b/240 to interactive video player 122c concurrently with distributing enriched video stream 140a/240 to interactive video player(s) 122b and/or 122a.

Thus, the present application discloses systems and methods for performing cloud-based image rendering for video stream enrichment. As described above, the systems and methods disclosed herein augment what users of interactive video player(s) 122a-122c are able to see when tuning into video stream 130/230, without requiring the user to use a customized application that runs on their device. Instead of creating a custom application that runs on a user's interactive video player that is capable of providing the graphics rendering required for such an interactive experience, according to the present inventive principles, graphical video enhancements may be rendered for the interactive video player on one of remote video rendering engine(s) 108 that is driven by user input data, such as user input data 126a, 126b, or 126c.

The cloud-based video enrichment solution disclosed in the present application confers several benefits. First, the present solution allows a user's interaction experience with a video stream to be augmented or otherwise enriched by content that could not ordinarily be rendered on their video player due to performance limitations. That is to say, because, according to the present inventive principles, video enhancements such as 3D graphics are remotely rendered and distributed as part of enriched video stream 140a/140b/240, the only constraint on the quality of rendered video enhancement(s) 138/238a/238b is the processing capability of cloud-based video rendering engine(s) 108. Thus, it is emphasized that according to the present inventive principles, rendering of a video enhancement or enhancements identified in action 356 of flowchart 350 is not rendered by the interactive video player receiving that video enhancement.

Second, the present solution supports the continued use of existing video streaming applications and existing web browser based video players while providing new and heretofore unavailable interactive experiences to users. The same video stream is forwarded to the video forwarding unit 101 and the non-interactive video player(s) 120, for example, from content provider 114. Moreover, no additional software is required to view enriched video streams 140a/140b/240 or lightly enhanced video stream 142 in use cases in which rendered video enhancements 138/238a/238b are encoded to conform to well established standards, such as HLS, LHLS, or DASH.

Third, interactive views for the user of an interactive video player are not limited solely to 2D overlays, but may also include detailed 3D renderings of objects, rendered at a quality level that is unconstrained by the graphics processing capability of the user's video player (e.g., interactive video player(s) 122a-122c). For example, a video stream of a weather report could be enriched with 3D renderings of topography and visual effects for weather.

Fourth, interactive video player(s) 122a-122c with interactive capabilities advantageously receive enriched video stream 140a/140b/240 with rendered video enhancements 138/238a/238b, while non-interactive video player(s) 120 receive either standard static video stream 130/230 forwarded by video forwarding unit 101 or advantageously receive lightly enhanced video stream 142 from video enrichment unit 102.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A cloud-based system comprising:
   a video forwarding computer configured to:
      detect, over a communication network, at least one non-interactive video player linked to the video forwarding computer;
      forward, over the communication network, a video stream to the at least one non-interactive video player, wherein the video stream includes at least one predetermined video segment and at least one customizable video segment; and
      concurrently with forwarding the video stream to the at least one non-interactive video player, forward, over the communication network, the video stream to a video enrichment computer;
   the video enrichment computer configured to:
      receive, over the communication network, the video stream from the video forwarding computer;
      detect, over the communication network, at least one interactive video player linked to the video enrichment computer;
      start streaming, over the communication network, the at least one predetermined video segment of the video stream received from the video forwarding computer to the at least one interactive video player;
      while streaming the at least one predetermined video segment of the video stream received from the video forwarding computer to the at least one interactive video player:
         identify a video enhancement corresponding to the at least one customizable video segment in the video stream received from the video forwarding computer;
         insert a rendered video enhancement into the at least one customizable video segment of the video stream received from the video forwarding computer to produce a customized video segment; and
         continue streaming, over the communication network, the video stream, including the customized video segment, to the at least one interactive video player.

2. The cloud-based system of claim 1, wherein the customized video segment of the video stream is streamed to the at least one interactive video player in real-time with respect to receiving the video stream from the video forwarding computer.

3. The cloud-based system of claim 1, wherein the rendered video enhancement comprises a user interactive object rendered as a three-dimensional (3D) image.

4. The cloud-based system of claim 1, wherein the video enrichment computer is further configured to obtain the rendered video enhancement from a video rendering engine communicatively coupled to the video enrichment computer.

5. The cloud-based system of claim 4, wherein the video enrichment computer is communicatively coupled to the video rendering engine via the communication network.

6. The cloud-based system of claim 4, wherein the video rendering engine is configured to encode the rendered video enhancement as one of Hypertext Transfer Protocol (HTTP) Live Stream (HLS) video, low-latency HLS (LHLS) video, and Dynamic Adaptive Streaming over HTTP (DASH) video.

7. The cloud-based system of claim 4, wherein the rendered video enhancement comprises a metadata tag applied by the video rendering engine, the metadata tag instructing the at least one interactive video player to enable interactive feedback by a user during playback of the rendered video enhancement.

8. The cloud-based system of claim 7, wherein the metadata tag is an ID3 tag stored in the rendered video enhancement by the at least one video rendering engine.

9. The cloud-based system of claim 1, wherein the at least one interactive video player comprises at least a first interactive video player a second interactive video player, and a third interactive video player, and wherein the video enrichment computer is further configured to stream the customized video segment to each of the first interactive video player and the second interactive video player, but not to the third interactive video player.

10. The cloud-based system of claim 1, wherein the at least one interactive video player comprises a plurality of interactive video players, and wherein the video enrichment computer is further configured to:
    identify a different video enhancement corresponding to the at least one customizable video segment for another of the plurality of interactive video players;
    insert the different video enhancement as a different rendered video enhancement into the at least one customizable video segment to produce a different customized video segment; and
    stream the different customized video segment to the another of the plurality of interactive video players concurrently with streaming the customized video segment to the at least one interactive video player.

11. A method for use by a cloud-based system including a video forwarding computer and a video enrichment computer, the method comprising:
    detecting, over a communication network, by the video forwarding computer, at least one non-interactive video player linked to the video forwarding computer;
    forwarding, over the communication network, by the video forwarding computer, a video stream to the at least one non-interactive video player, wherein the video stream includes at least one predetermined video segment and at least one customizable video segment;
    concurrently with forwarding the video stream to the at least one non-interactive video player, forwarding, over the communication network, by the video forwarding computer, the video stream to a video enrichment computer;
    receiving, over the communication network, by the video enrichment computer, the video stream from the video forwarding computer;
    detecting, over the communication network, by the video enrichment computer, at least one interactive video player linked to the video enrichment computer;

starting to stream, over the communication network, the at least one predetermined video segment of the video stream received from the video forwarding computer to the at least one interactive video player;

while streaming the at least one predetermined video segment of the video stream received from the video forwarding computer to the at least one interactive video player:

identifying, by the video enrichment computer, a video enhancement corresponding to the at least one customizable video segment in the video stream received from the video forwarding computer;

inserting, by the video enrichment computer, a rendered video enhancement into the at least one customizable video segment of the video stream received from the video forwarding computer to produce a customized video segment stream; and continuing to stream, over the communication network, by the video enrichment computer, the video stream, including the customized video segment, to the at least one interactive video player.

12. The method of claim 11, wherein the customized video segment of the video stream is streamed to the at least one interactive video player in real-time with respect to receiving the video stream from the video forwarding computer.

13. The method of claim 11, wherein the rendered video enhancement comprises a user interactive object rendered as a three-dimensional (3D) image.

14. The method of claim 11, wherein the video enrichment computer obtains the rendered video enhancement from a video rendering engine communicatively coupled to the video enrichment computer.

15. The method of claim 14, wherein the video enrichment computer is communicatively coupled to the video rendering engine via the communication network.

16. The method of claim 14, wherein the video rendering engine is configured to encode the rendered video enhancement as one of Hypertext Transfer Protocol (HTTP) Live Stream (HLS) video, low-latency HLS (LHLS) video, and Dynamic Adaptive Streaming over HTTP (DASH) video.

17. The method of claim 14, wherein the rendered video enhancement comprises a metadata tag applied by the video rendering engine, the metadata tag instructing the at least one interactive video player to enable interactive feedback by a user during playback of the rendered video enhancement.

18. The method of claim 17, wherein the metadata tag is an ID3 tag stored in the rendered video enhancement by the at least one video rendering engine.

19. The method of claim 11, wherein the at least one interactive video player comprises at least a first interactive video player a second interactive video player, and a third interactive video player, and wherein the video enrichment computer is further configured to stream the customized video segment to each of the first interactive video player and the second interactive video player, but not to the third interactive video player.

20. The method of claim 11, wherein the at least one interactive video player comprises a plurality of interactive video players, the method further comprising:

identifying, by the video enrichment computer, a different video enhancement corresponding to the at least one customizable video segment for another of the plurality of interactive video players;

inserting, by the video enrichment computer, the different video enhancement as a different rendered video enhancement into the at least one customizable video segment to produce a different customized video stream segment; and streaming, by the video enrichment computer, the different customized video stream segment to the another of the plurality of interactive video players concurrently with streaming the customized video segment to the at least one interactive video player.

* * * * *